(12) United States Patent
Tajiri

(10) Patent No.: US 6,742,897 B1
(45) Date of Patent: Jun. 1, 2004

(54) LIQUID CRYSTAL PROJECTOR DEVICE

(75) Inventor: Shinichiro Tajiri, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/720,234

(22) PCT Filed: Jul. 5, 1999

(86) PCT No.: PCT/JP99/03624

§ 371 (c)(1),
(2), (4) Date: Dec. 9, 2000

(87) PCT Pub. No.: WO00/02084

PCT Pub. Date: Jan. 13, 2000

(30) Foreign Application Priority Data

Jul. 3, 1998 (JP) ............................................. 10-188350

(51) Int. Cl.[7] ......................... G03B 21/14; G03B 21/00; G03B 21/26; G03B 21/28; G02F 1/1335
(52) U.S. Cl. ............................. 353/20; 353/31; 353/34; 353/37; 353/82; 353/98; 349/9; 348/751
(58) Field of Search ............................. 353/20, 31, 34, 353/37, 82, 98; 349/9; 348/751

(56) References Cited

U.S. PATENT DOCUMENTS

| | | | | | |
|---|---|---|---|---|---|
| 5,389,982 | A | * | 2/1995 | Lee | 353/37 |
| 6,023,370 | A | * | 2/2000 | Lin | 359/487 |
| 6,089,719 | A | * | 7/2000 | Lin | 353/33 |
| 6,176,583 | B1 | * | 1/2001 | Sawai | 353/20 |
| 6,176,586 | B1 | * | 1/2001 | Hirose et al. | 353/31 |
| 6,183,090 | B1 | * | 2/2001 | Nakanishi et al. | 353/20 |
| 6,183,091 | B1 | * | 2/2001 | Johnson et al. | 353/20 |
| 6,343,864 | B1 | * | 2/2002 | Tajiri | 353/20 |
| 6,347,014 | B1 | * | 2/2002 | Hayashi et al. | 359/634 |
| 6,375,330 | B1 | * | 4/2002 | Mihalakis | 353/31 |
| 6,628,346 | B1 | * | 9/2003 | Ebiko | 349/9 |
| 6,667,834 | B2 | * | 12/2003 | Itoh | 359/485 |

* cited by examiner

*Primary Examiner*—Russell Adams
*Assistant Examiner*—Magda Cruz
(74) *Attorney, Agent, or Firm*—Flynn, Thiel, Boutell & Tanis, P.C.

(57) ABSTRACT

A liquid crystal projector device, wherein an s-polarization PBS (4) forms light from a light source (1) a set of s-polarization components; an optical unit (7) reflects a green-region light and rotates by 90° the planes of polarization of a blue-region light and red-region light for outputting as p-polarization lights by reflection; a PBS (8) reflects an s-polarization green-region light and transmits p-polarization blue-region and red-region lights which are then separated from each other by a dichroic prism (9); the s-polarization green-region light is modulated into a p-polarization projected image light and reflected by a reflection type liquid crystal sheet (10G) to transmit the PBS (8); the p-polarization blue-region and red-region lights shine on reflection type liquid crystal sheets (10B, 10R) and are modulated respectively into s-polarization projected image lights, reflected and synthesized by the dichroic prism (9) before being reflected by the PBS (8) for projection by a projection lens (11).

13 Claims, 5 Drawing Sheets

《Transmittance Characteristics of Dichroic Layer》

LIQUID CRYSTAL PROJECTOR DEVICE

TECHNICAL FIELD

The present invention relates to a liquid crystal projector device incorporating a reflection type liquid crystal panel designed for realizing a greater compactness by reducing the number of parts.

BACKGROUND ART

The conventional liquid crystal projector device using the reflection type liquid crystal panel is designed so that, for example as shown in FIG. 1, a white light from a light source 1 is condensed by lens arrays 2, 5 and a lens 6; the condensed light is separated into the lights for three colors coming within a red color range, a green color range and a blue color range respectively; s-polarized light components of the different color ranges are separated by polarizing beam splitters (PBS) 44R, 44G and 44B to be incident on reflection type liquid crystal panels 41, 42 and 43 for the ranges of red color, green color and blue color 10R, 10G and 10B respectively; image-forming lights having p-polarized light components of different color ranges, which have been modulated and reflected to be output, are synthesized by a cross dichroic prism 45 to be projected on a screen through a projection lens 11. It is essential for such a conventional liquid crystal projector device not only to provide three PBS's and a costly cross dichroic prism but also to lay out the reflection type liquid crystal panels 10R, 10G and 10B on the optical paths of the light rays of red color range, green color range and blue color range respectively so that these light rays will not interfere with one another, preventing the use of a more compact casing.

The present invention was made in consideration of such a problem and designed not only to reduce the dimensions of the device by providing an optical block having a dichroic reflection characteristic and a retarding characteristic so that the plane of polarization of the light ray of the specified wavelength range can be rotated by 90° to reduce the number of parts that results in the reduction of the dimensions of the device and also makes the three reflection type liquid crystal panels compatible with one another by using a ½ retarding plate.

DISCLOSURE OF THE INVENTION

According to the liquid crystal projector device of the present invention, which is primarily designed so that the white light, coming from the light source, is separated into the lights of red color range, green color range and blue color range and polarized respectively; the separated and polarized light rays are made to be incident on three pieces of reflection type liquid crystal panels for red color range, green color range and blue color range respectively; the image-forming lights modulated and reflected by the reflection type liquid crystal panels are synthesized for projection; wherein an optical unit designed for rotating by 90° the plane of polarization of a specified light ray out of those of the three color ranges is provided so that either the light ray of a color range, whose plane of polarization has been rotated 90°, outputted from the optical unit or the light ray of a color range, whose plane of polarization has not been rotated, is made to be incident on each of the reflection type liquid crystal panels.

The optical unit comprises a first dichroic layer, which permits the transmission of the light ray of a specified color range and reflects the light rays of other color ranges, a retarding layer for rotating by 90° the plane of polarization of the light ray, which is allowed to pass through the first dichroic layer, and a total reflection layer for totally reflecting the light ray from the retarding layer.

Further, the optical unit may comprise a second dichroic layer designed for transmitting the light ray of a specified color range while reflecting the light rays of other color ranges, a retarding layer, for rotating by 90° the plane of polarization of the light rays which has passed through the second dichroic layer and a third dichroic layer having a predetermined gradient dichroic characteristic for reflecting the light rays coming from the retarding layer so that the difference in dichroic characteristics resulting from the difference in the angle of incidence to the second dichroic layer owing to being not parallel to the incident light.

Then, a reflection unit comprising a dichroic layer having a dichroic characteristic similar to that of the first dichroic layer or the second dichroic layer, a transmission layer, which will not cause a phase difference corresponding to the above-mentioned retarding layer, and a total reflection layer is provided before the optical unit in order to correct the optical path difference occurring in the optical unit.

Further, the first dichroic layer for s-polarization or the second dichroic layer for the same is used for a high transmittance characteristic that contributes to an effective utilization of the light rays.

Further, a ½ retarding plate for rotating by 90° the plane of polarization of incident light is provided before the reflection type liquid crystal panel, which is similar to the other two reflection type liquid crystal panels, for receiving the light ray reflected by the first dichroic layer or the second dichroic layer, whereby the common reflection type liquid crystal panels can be used.

Further, a polarization beam splitter provided for reflecting a light ray of a color range whose plane of polarization is not rotated by the optical unit while transmitting the light rays of other two color ranges whose planes of polarization are rotated by 90° respectively, a dichroic prism provided for making the light ray of one color range reflected by the polarization beam splitter incident on one of the reflection type liquid crystal panels, while transmitting one light ray of one color range out of the two light rays which have passed through the polarization beam splitter and reflecting the other so that the two light rays of the two different color ranges are incident on the two reflection type liquid crystal panels respectively, and the image-forming light rays, which are modulated and reflected by the two reflection type liquid crystal panels, synthesized by the dichroic prism and reflected by the polarization beam splitter to be projected on a screen through a projection lens together with an image-forming light ray, which has passed through the polarization beam splitter and then modulated and reflected by the one reflection type liquid crystal panel, are primary constituents, wherein the dichroic prism is designed so that the reflected light ray is given on the opposite side to the projection lens, and a corresponding liquid crystal panel is provided at the corresponding position for easy mounting of the projection lens flange.

Further, the first dichroic layer or the second dichroic layer is one for reflecting the light ray of green color range and capable of making the characteristic of the dichroic prism milder.

BEST MODES FOR CARRYING OUT THE INVENTION

The modes for carrying out the present invention will be explained below referring to the related drawings.

Figure 1:
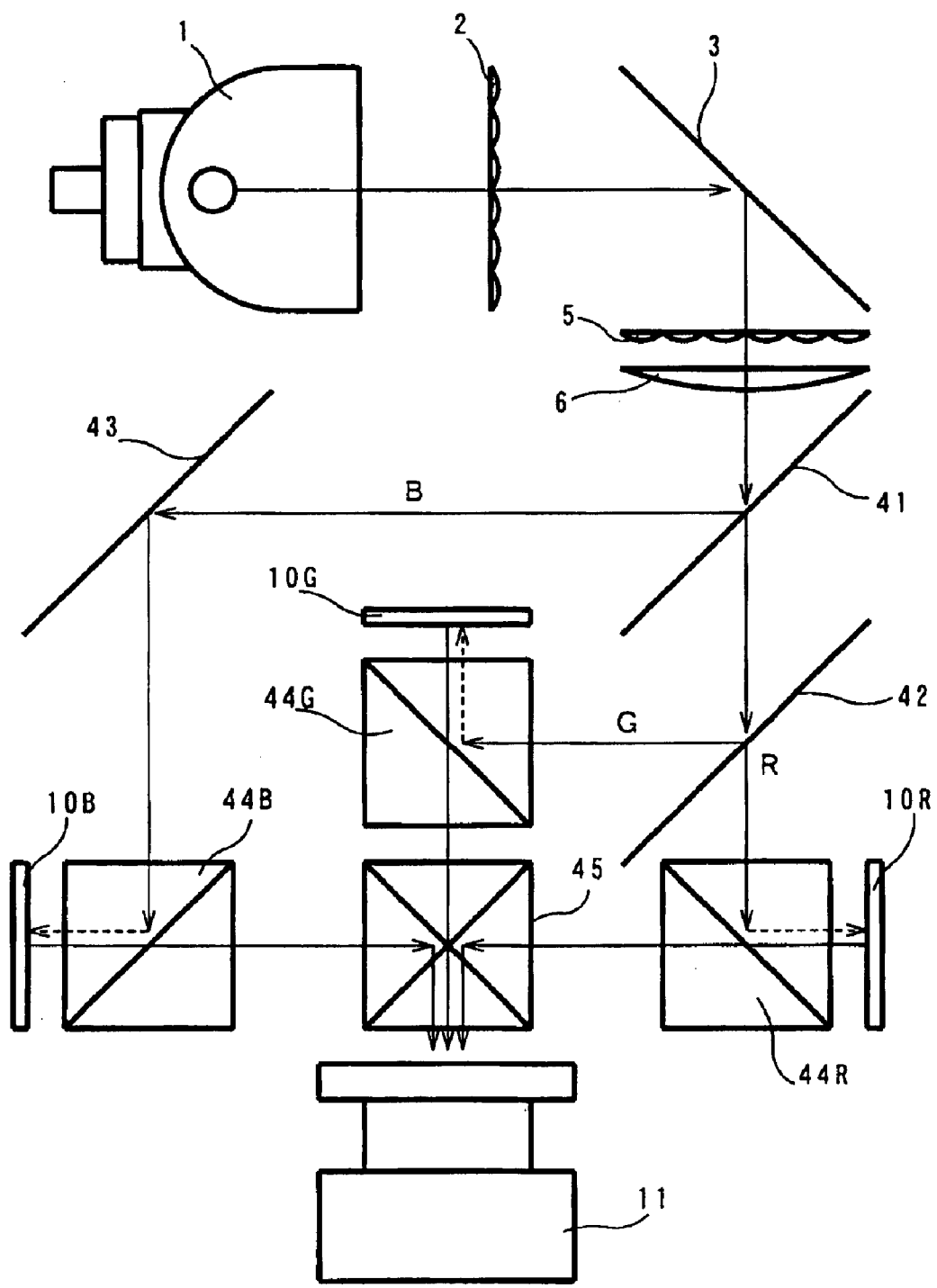
FIG. 1 is a structural drawing showing the principal parts of a conventional liquid crystal projector device.
Figure 2:
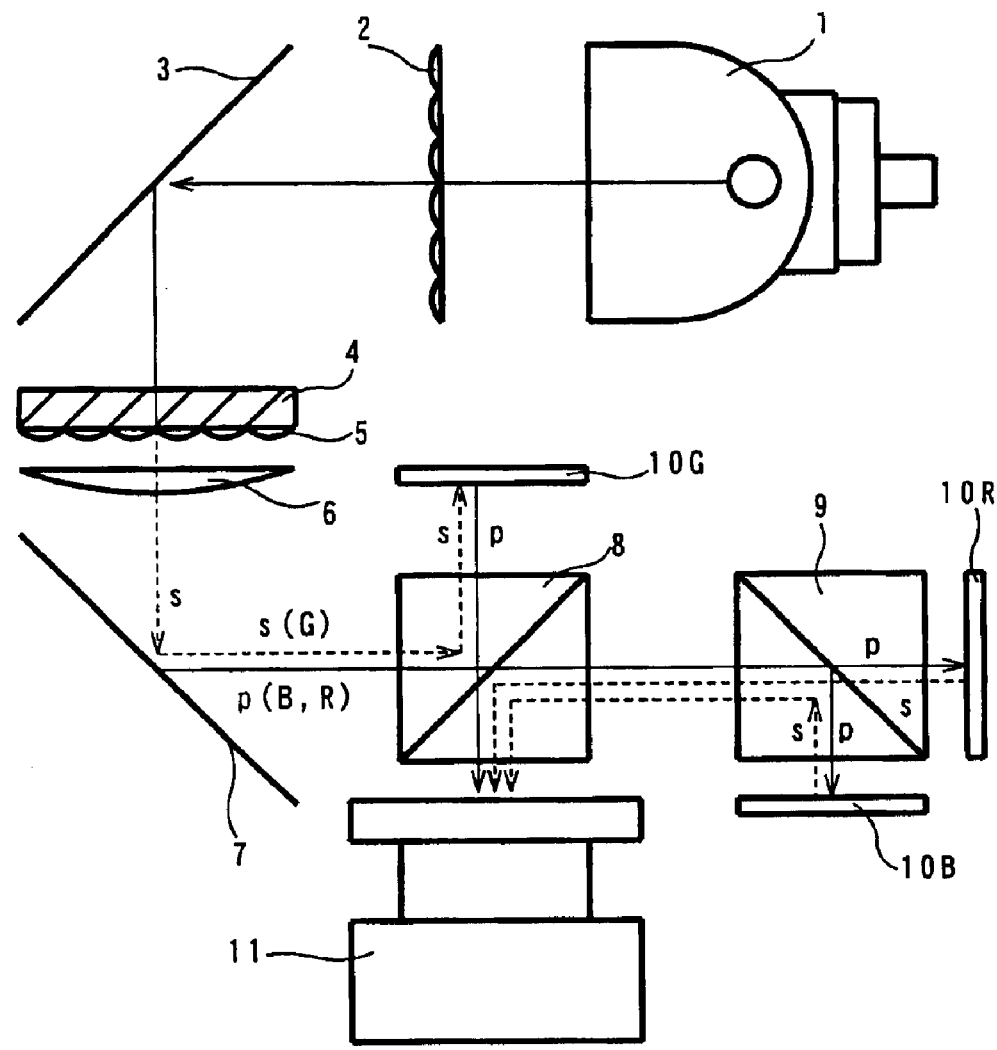
FIG. 2 is a structural drawing showing the principal parts of the liquid crystal projector device as the first embodiment of the present invention.
Figure 3:
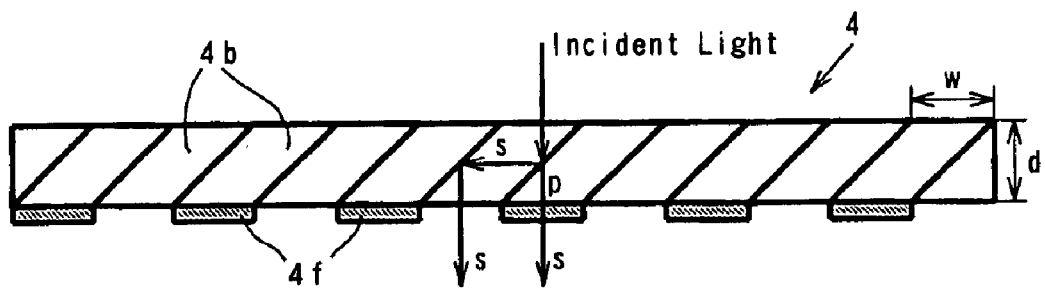
FIG. 3 is an explanatory drawing of the s-polarized light PBS.

FIG. 2 shows the liquid crystal projector device as the first embodiment of the present invention, wherein 1 represents a light source of the white light using a metal halide lamp or the like; 2 and 5, lens arrays for condensing the white light from the light source 1; 3, a total reflection mirror; 4, a polarization beam splitter (hereinafter referred to as s-polarized light PBS) for outputting the s-polarized light components of the white light from the light source 1; 6, a condenser lens for further condensing the white light from the lens array 5; 7, an optical unit for converting the component of the light ray of a specific color range, e.g., red color range or blue color range, out of the white light from the condenser lens from the s-polarized light component to the p-polarized light component for reflection; 8, a PBS for reflecting the s-polarized light component of the light rays from the optical unit while transmitting the p-polarized light component; 9, a dichroic prism for transmitting the light ray of red color range out of the light rays which have passed through the PBS 8 while reflecting the light ray of the blue color range; 10G, a reflection type liquid crystal panel of s-polarized light incidence type for green color range for forming an image by reflecting the light ray reflected by the PBS 8; 10B, a reflection type liquid crystal panel of p-polarized light incidence type for blue color range for forming an image by reflecting the light ray reflected by the dichroic prism 9; 10R, a reflection type liquid crystal panel of p-polarized light incidence type for red color range for forming an image by reflecting the light ray transmitted by the dichroic prism 9; 11, a projection lens.

The s-polarized light PBS 4 comprises accumulated sub-blocks 4b of the PBS, each being equal in surface width w and thickness d and formed into a parallelogram inclined at 45°, and ½ retarding plates 4f arranged on the output planes of every other sub-blocks 4b. The s-polarized light PBS 4 composed as described above is designed to output only the s-polarized components of the light by being arranged so that the light rays outputted from the lenses of lens array 2 are condensed by the sub-blocks 4b which are not provided with the ½ retarding plates 4f, while the sub-blocks 4b with the ½ retarding plates prevent the incidence of light rays.

That is, of the light of incidence, the p-polarized light component is transmitted while the s-polarized component is reflected at the inclined boundary planes of the sub-blocks 4b. The plane of polarization of the transmitted p-polarized light component is converted into the plane of polarization of the s-polarized light component for output by the effect of the ½ retarding plate 4f.

The reflected s-polarized light component is again reflected for output at the boundary planes of the sub-blocks 4b. In this way, only the s-polarized light components of light rays are permitted to pass through the s-polarized light PBS 4.

When the lens array 2 is arranged so that the outputs of the light therefrom are condensed by the sub-blocks 4b provided with the ½ retarding plates 4f, the p-polarized component which has passed through the boundary plane is outputted directly, while the s-polarized light components reflected by the boundary plane are reflected again to be converted into the p-polarized light components with respect to their planes of polarization, for being output. In this way, all the light rays passing through the s-polarized light PBS 4 are converted into the p-polarized light components.

Figure 4:
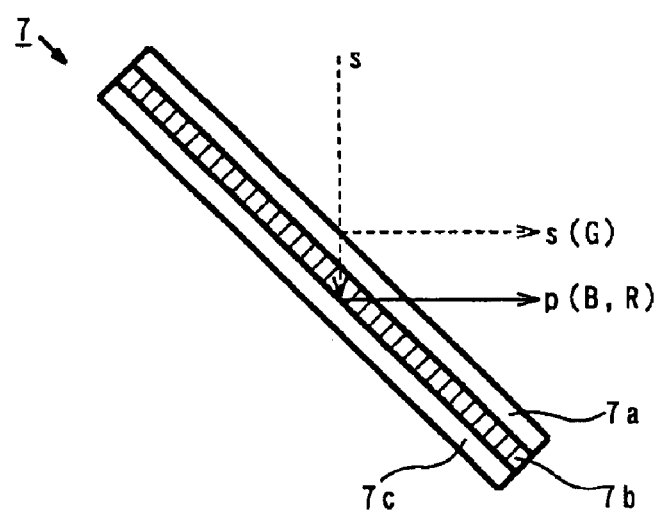
FIG. 4 is a detail drawing showing the optical unit of the liquid crystal projector device of FIG. 2.

The white light, as naturally polarized light, from the light source 1 is condensed by two sets of lens arrays 2 and 5, having a total reflection mirror 3 and s-polarized light PBS 4 interposed in between respectively, and a condenser lens 6 to incident light onto an optical unit 7. The optical unit 7, as shown in FIG. 4, is formed by accumulating a first dichroic layer 7a, a retarding layer 7b and a total reflection layer 7c, wherein, for example, the first dichroic layer 7a reflects the light of green color range while transmitting the light of blue color range and the light of red color range, and the retarding layer 7b rotates by 90° the planes of polarization of the lights of the blue color range and red color range, which have passed through the first dichroic layer, while being reflected by the total reflection layer 7c (a total reflection mirror) for emission. That is, (the retarding layer 7b) is a retarding plate that keeps unrotated the plane of polarization of the light of the green color range, while rotating by 90° the planes of rotation of the lights of the blue color range and the red color range. By keeping unrotated the plane of rotation of the light of the green color range, even if the characteristic (dichroic characteristic) of the subsequent dichroic prism for separating the light of blue color range and the light of the red color range is set a mild level, the light incident on the reflection type liquid crystal panel 10B for the blue color range and the light incident on that for the red color range will not interfere with each other because of their wavelength ranges being sufficiently differentiated from each other.

The light (s-polarized light) of the green color range, reflected by the first dichroic layer 7a, is reflected by the PBS 8 to be incident on the reflection type liquid crystal panel 10G for green color range and output by reflection an image-forming light modulated by the green color video signal. Being a p-polarized light, the image-forming light passes through the PBS 8. Further, the light of blue color range and the light of red color range, which have passed through the first dichroic layer 7a, pass the retarding layer 7b and are reflected by the total reflection layer 7c to become the p-polarized lights whose plane of polarization are rotated by 90° respectively, then passing through the PBS 8 to be incident on the dichroic prism 9. Then, the light of blue color range is reflected by the dichroic prism 9 to be incident on the reflection type liquid crystal panel 10B for blue color range to output the s-polarized image-forming light modulated by the blue color video signal. The light of red color range passes through the dichroic prism 9 to be incident on the reflection type liquid crystal panel 10R for red color range to output s-polarized image-forming light modulated by the red color video signal. These image-forming lights of blue color range and red color range are synthesized by the dichroic prism and reflected by the PBS 8 to be projected on the screen through the projection lens 11 together with the image-forming light for green color range coming from the reflection type liquid crystal panel 10G passing through the PBS 8.

Figure 5:
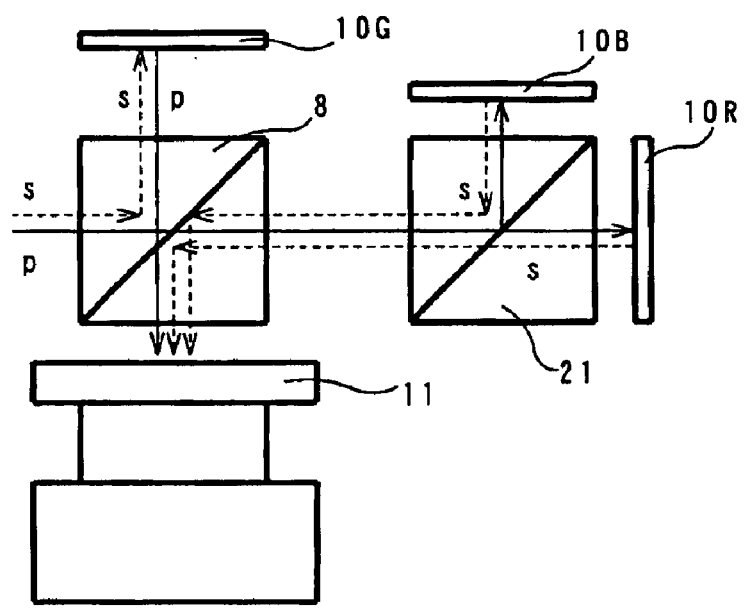
FIG. 5 is a partial structural drawing of the variation of the liquid crystal projector device of FIG. 2, wherein the arrangement involving the dichroic prism and the reflection type liquid crystal panel is altered.

Further, as shown in the partial composition drawing of FIG. 5, by providing the dichroic prism 21 for reflecting the light of blue color range, separated from the light coming from the PBS 8, on the opposite side to the projection lens 11, the reflection type liquid crystal panel 10B for blue color range may be provided on the opposite side to the projection lens 11. By doing so, a space sufficient for easy mounting of the flange for the projection lens 11 can be provided between the projection lens 11 and the reflection type liquid crystal panel 10B.

Figure 6:
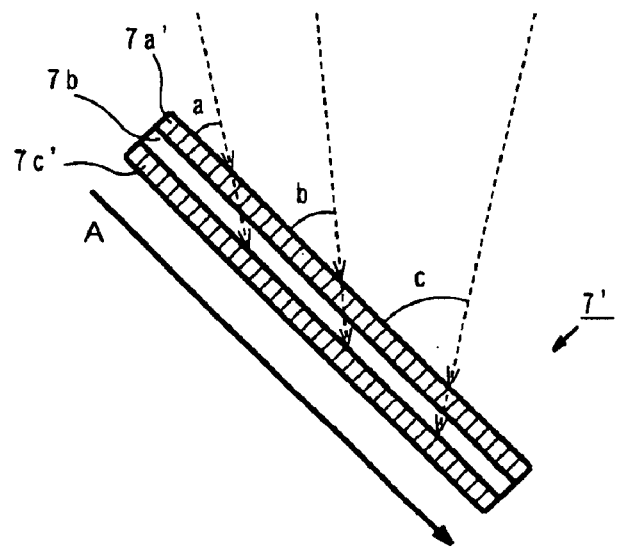
FIG. 6 is a structural drawing of the principal parts of another optical unit.

FIG. 6 shows another example of the optical unit 7 designed to correct the difference in dichroic characteristics resulting from the difference in the angle of incidence (angle of incidence a<b<c) to the dichroic layer due to unparallel incident light rays. The dichroic layer has a characteristic that the smaller the incident angle, the longer the cut-off wavelength of the transmitting light ray and the shorter the cut-off wavelength of the reflected light ray. That is, as shown in FIG. 6, at incident angle a, the cut-off wavelength of the transmitting light ray is longer than that at incident angle b (in terms of optical axis), while the cut-off wavelength of the reflected light ray becomes longer.

Therefore, the optical unit 7' comprises the second dichroic layer 7a', whose dichroic characteristic is inclined in the direction of arrow A, for transmitting the light rays of blue color range and red color range while reflecting the light ray of green color range, the retarding layer 7b, for rotating by 90° the plane of polarization of the light ray that has passed through the second dichroic layer 7a', and the third dichroic layer 7c', whose dichroic characteristic for reflecting the light ray coming from the retarding layer 7b is inclined in the direction of arrow A, whereby the characteristic of the dichroic layer (for cut-off wavelength) is continuously varied for correction.

Further, the reason that the characteristic of the dichroic layer is inclined in the direction of the arrow is due to that there is no significant difference in the incident angles at both ends (at front end and rear end in the figure) where the (optical unit 7') is perpendicular to the optical axes of the incident light rays, but, since the optical unit 7' is actually inclined 45° to the optical axis, there occurs a large difference in the incident angle due to that there occurs a difference in picture width (the difference between the upper left-hand end and the lower right-hand end), which is about 1.4 times (inverse sine 45°) the picture width where (the optical unit 7') is kept level. Further, by substituting the third dichroic layer 7c' for the total reflection layer 7c shown in FIG. 4, the differences in characteristics of both the dichroic layers due to the angle of incidence of the light ray can be corrected separately, and, simultaneously, the unnecessary components of the light ray which has passed through the second dichroic layer 7a can be omitted by letting them pass through the third dichroic layer 7c'.

Figure 7:
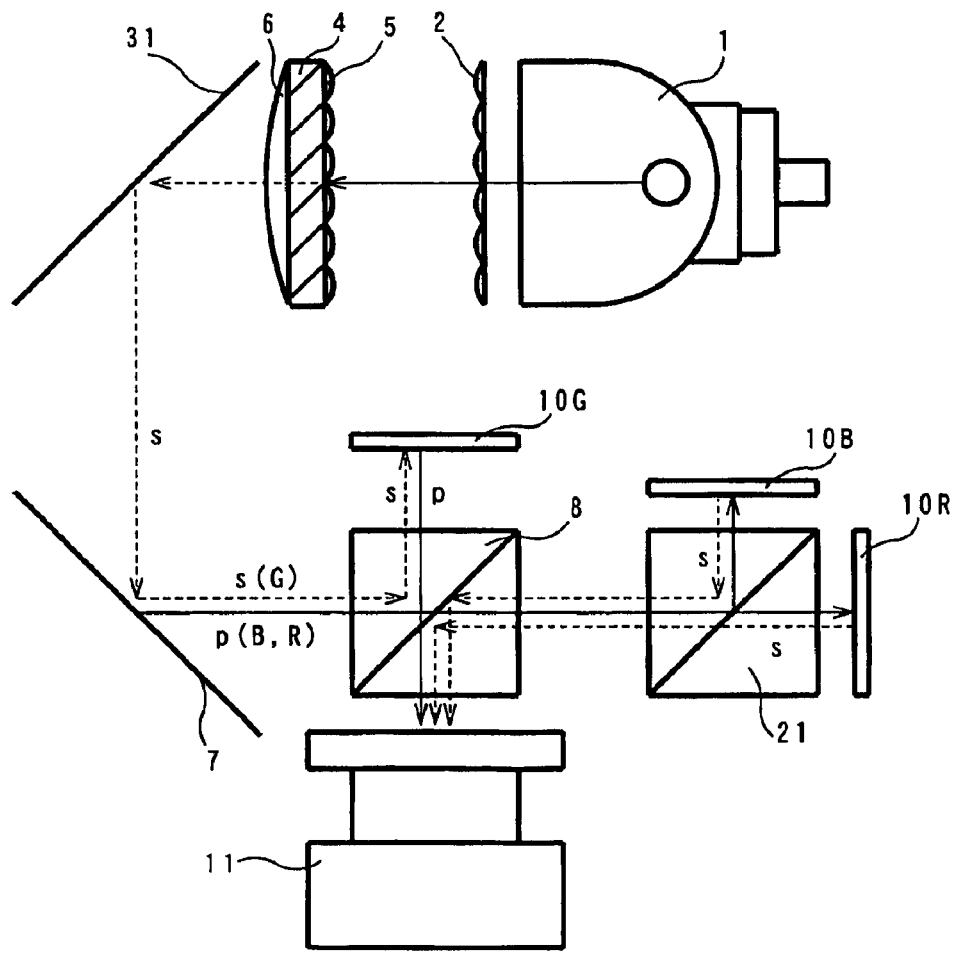
FIG. 7 is a structural drawing showing the principal parts of the liquid crystal projector device as the second embodiment of the present invention.

FIG. 7 shows the liquid crystal projector device as a second embodiment of the present invention. With this liquid crystal projector device, the total reflection mirror 3 shown in FIG. 2 is replaced with a reflection unit 31, which is provided before the optical unit 7 (or 7'). This is because of the necessity of correcting the disagreement of the irradiation areas resulting from the difference in the optical path between the light ray reflected by the first dichroic layer 7a of the optical unit 7 and the light ray reflected by the total reflection layer 7c.

Figure 8:
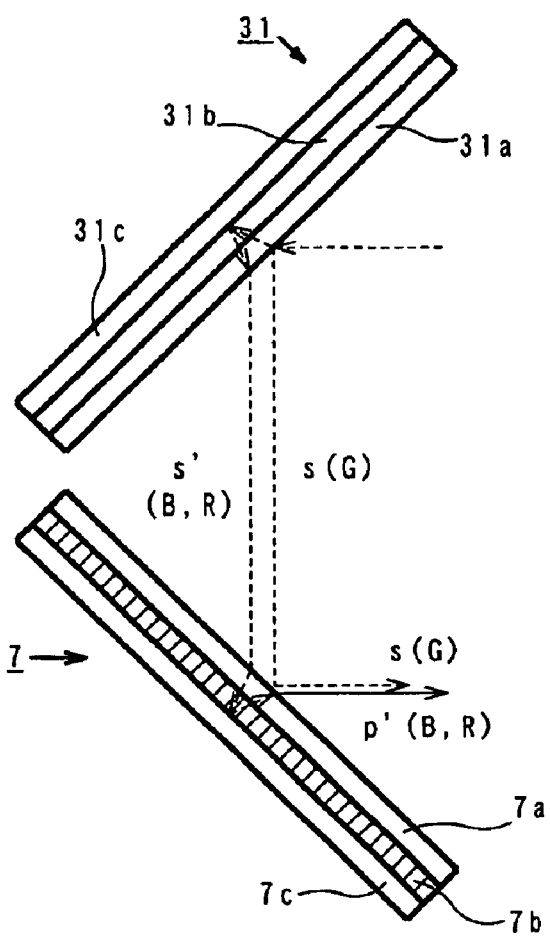
FIG. 8 is a detail drawing showing the reflection unit and the optical unit of the liquid crystal projector unit of FIG. 7.

The reflection unit 31, as shown in FIG. 8, comprises a dichroic layer 31a, having a characteristic similar to that of the first dichroic layer 7a (or the second dichroic layer 7a'), a transmitting layer 31b (a layer not producing phase difference), having a thickness equivalent to that of the retarding layer 7b, and a total reflection layer 31c. With this arrangement, the light rays s' (the lights of blue color range and red color range), reflected by the total reflection layer 31c of the reflection unit 31, are made to be reflected by the total reflection layer 7c (or the third dichroic layer 7c') of the optical unit 7 (or 7') (to become a light rays p') whose optical paths substantially coincide with the optical path of the light ray s (a light ray of green color range), reflected by the dichroic layer 31a and the first dichroic layer 7a (or the second dichroic layer 7a'), so that the disagreement of the irradiation areas of the reflection type liquid crystal panels will not occur.

Figure 9:
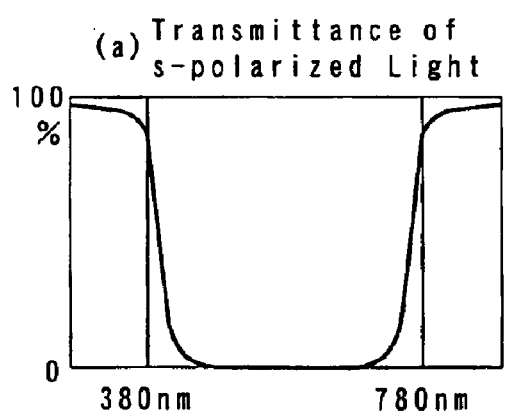
FIG. 9 is a diagram showing the transmittance characteristics of the dichroic layer to the p-polarized light and s-polarized light.
Figure 9:
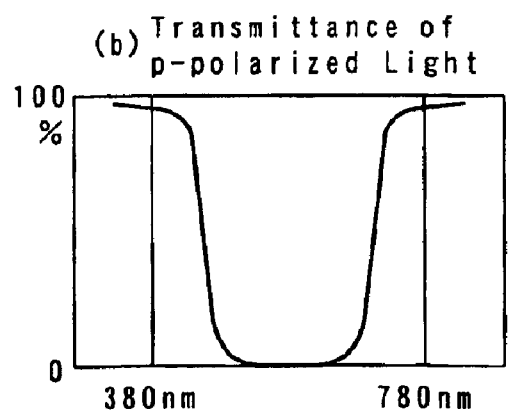

The explanation of the numerals and symbols similar to those given in FIG. 2 will be omitted here. Further, in the case discussed above, s-polarized light PBS 4 is designed to transmit the s-polarized light component, and the dichroic layer 7a or 7a' for s-polarized light are provided on the surface of the optical unit 7a or 7a', because, as seen from FIG. 9, the transmittance characteristic of the dichroic film (layer) varies depending on whether the transmitting light ray is the s-polarized light ray or the p-polarized light ray, and the transmittance of the light ray which has passed the retarding layer 7b, i.e., the p-polarized light ray, becomes high when the wavelength is within the range of about 380 nm or less and about 780 nm or more, entailing the rise of utilization rate of the wavelength range and resultant increase in the brightness of the projected picture. Further, since the s-polarized light PBS 4 transmits the s-polarized light, the dichroic layer for s-polarized light is also used with the reflection unit.

Further, the ½ retarding plate may be provided before the reflection type liquid crystal panel 10G for green color range in order to rotate by 90° the plane of polarization of the s-polarized light ray for conversion into a p-polarized light ray, thereby enabling the p-polarized light incidence type reflection type liquid crystal panel, similar to the reflection type liquid crystal panels 10B and 10R, to be used as the reflection type liquid crystal panel 10G for making these three reflection type liquid crystal panels compatible with one another. Further, the s-polarized image-forming light, modulated and reflected by the reflection type liquid crystal panel 10G, is converted into a p-polarized light by the ½ retarding plate to pass through the PBS 8.

INDUSTRIAL APPLICABILITY

As discussed in the foregoing, the present invention is designed to take advantage of a reflection unit (an optical unit), comprising a dichroic layer, a retarding layer and a total reflection layer (or a dichroic layer) and having a dichroic characteristic and a retarding characteristic, to reduce the number of relatively costly PBS's, thereby providing a liquid crystal projector device featuring a lower cost and smaller dimensions.

What is claimed is:

1. A liquid crystal projector device designed so that white light from a light source is reflected by a total reflection mirror and polarized light rays incident on three reflection liquid crystal panels for red color range, green color range and blue color range are modulated and reflected into image-forming light rays to be synthesized for being projected, and additionally comprising an optical unit comprising a first dichroic layer for transmitting a light ray of a specified color range while reflecting light rays of other color ranges, a retarding layer for rotating by 90° the plane of polarization of the light ray which has passed through the first dichroic layer and a total reflection layer for totally reflecting the light ray from the retarding layer.

2. The liquid crystal projector device according to claim 1, wherein the first dichroic layer is for s-polarized light.

3. The liquid crystal projector device according to claim 1, wherein a ½ retarding plate for rotating by 90° the plane of polarization of incident light is provided before the reflection liquid crystal panel for receiving light rays reflected by the first dichroic layer, and a plane of polarization incidence type liquid crystal panel is used as each of said reflection liquid crystal panels.

4. The liquid crystal projector device according to claim 1, wherein the first dichroic layer is designed for reflecting a light ray of green color range.

5. The liquid crystal projection device according to claim 1, wherein the optical unit consists essentially of the first dichroic layer, retarding layer and reflection layer.

6. The liquid crystal projection device according to claim 1, wherein the first dichroic layer, retarding layer and reflection layer are laminated together.

7. A liquid crystal projector device designed so that white light from a light source is reflected by a total reflection mirror and polarized light rays incident on three reflection liquid crystal panels for red color range, green color range and blue color range are modulated and reflected into image-forming light rays to be synthesized for being projected, and additionally comprising an optical unit comprising a second dichroic layer having a gradient dichroic characteristic for transmitting a light ray of a specified color range while reflecting light rays of other color ranges, a retarding layer for rotating by 90° the plane of polarization of the light ray which has passed through the second dichroic layer and a third dichroic layer having a predetermined gradient dichroic characteristic for reflecting the light ray coming from the retarding layer.

8. The liquid crystal projection device according to claim 7, wherein the optical unit consists essentially of the second dichroic layer, retarding layer and third dichroic layer.

9. The liquid crystal projection device according to claim 7, wherein the second dichroic layer, retarding layer and third dichroic layer are laminated together.

10. A liquid crystal projection device designed so that polarized light rays incident on three reflection liquid crystal panels for red color range, green color range and blue color range are modulated and reflected into synthesized image-forming light rays for being projected, and additionally comprising an optical unit comprising a first dichroic layer for transmitting a light ray of a specified color range while reflecting light rays of other color ranges, a retarding layer for rotating by 90° the plane of polarization of the light ray passing through the first dichroic layer and a total reflection layer for totally reflecting the light ray from the retarding layer and a reflection unit comprising a dichroic layer having a dichroic characteristic similar to that of the first dichroic layer and a transmitting layer that will not produce a phase difference provided before the optical unit so that a difference in optical path occurring in the optical unit resulting from the incidence of unparallel light rays can be corrected.

11. A liquid crystal projection device designed so that white light from a light source is reflected by a total reflection mirror and polarized light rays incident on three reflection liquid crystal panels for red color range, green color range, and blue color range are modulated and reflected into synthesized image-forming light rays for being projected, and additionally comprising an optical unit comprising a first dichroic layer for reflecting a light ray of a specified color range while transmitting light rays of other color ranges, a retarding layer for rotating by 90° the plane of polarization of the light rays passing through the first dichroic layer and a total reflection layer for totally reflecting the light rays from the retarding layer.

12. The liquid crystal projector device according to claim 11, comprising a polarized light beam splitter for reflecting the light ray of a color range whose plane of polarization has not been rotated by the optical unit onto a first reflection liquid crystal panel while transmitting the light rays of the other two color ranges whose planes of polarization have been rotated 90° respectively and a dichroic prism for transmitting one light ray of the other two color ranges which have passed through the polarized light beam splitter, and reflecting the other light ray of the other two color ranges, and designed so that the light rays of said other two color ranges, separated by the dichroic prism, are made to be incident on two reflection liquid crystal panels respectively, and image-forming light rays, modulated and reflected by the two respective reflection liquid crystal panels are synthesized by the dichroic prism and reflected by said polarized light beam splitter to be projected, through a projection lens on a screen together with the image-forming light ray, which has beam modulated and reflected by said first reflection liquid crystal panel to pass through the polarized light beam splitter, and so that said dichroic prism is designed for enabling the light ray to be reflected on its opposite side to the projection lens.

13. The liquid crystal projection device according to claim 11, additionally comprising a reflection unit comprising a dichroic layer having a dichroic characteristic similar to that of the first dichroic layer and a transmitting layer that will not produce a phase difference provided before the optical unit so that a difference in optical path occurring in the optical unit resulting from the incidence of unparallel light rays can be corrected.

* * * * *